United States Patent
Mayer et al.

(10) Patent No.: US 8,045,937 B2
(45) Date of Patent: Oct. 25, 2011

(54) DIGITAL PHASE FEEDBACK FOR DETERMINING PHASE DISTORTION

(75) Inventors: Thomas Mayer, Linz (AT); Nick Shute, Munich (DE)

(73) Assignee: Infineon Technologies AG, Neubiberg (DE)

( * ) Notice: Subject to any disclaimer, the term of this patent is extended or adjusted under 35 U.S.C. 154(b) by 516 days.

(21) Appl. No.: 12/251,169

(22) Filed: Oct. 14, 2008

(65) Prior Publication Data

US 2010/0091828 A1    Apr. 15, 2010

(51) Int. Cl.
*H04B 1/02*    (2006.01)

(52) U.S. Cl. ............. 455/91; 455/23; 455/42; 455/102; 455/108; 375/300; 375/302; 375/367; 331/17; 331/25; 331/161; 332/144; 332/145; 332/146

(58) Field of Classification Search .................. 455/23, 455/42, 102, 108, 110, 113, 91; 375/300, 375/302, 376; 331/17, 25, 161; 332/144–146, 332/119, 124–128, 159

See application file for complete search history.

(56) References Cited

U.S. PATENT DOCUMENTS

| 6,844,788 | B2 | 1/2005 | Chadwick | |
| 2002/0141510 | A1* | 10/2002 | Sridharan et al. | 375/300 |
| 2008/0205571 | A1* | 8/2008 | Muhammad et al. | 375/376 |
| 2008/0317169 | A1* | 12/2008 | Boos et al. | 375/300 |

* cited by examiner

*Primary Examiner* — Tuan Pham
(74) *Attorney, Agent, or Firm* — Lee & Hayes, PLLC

(57) ABSTRACT

A feedback loop is used to determine phase distortion created in a signal by directly extracting the phase distortion information from a feedback signal using original frequency modulation information.

14 Claims, 2 Drawing Sheets

DIGITAL PHASE FEEDBACK FOR DETERMINING PHASE DISTORTION

BACKGROUND

Polar loop transmitters have applications in many fields, such as radio, cellular radio, telecommunications, and the like. The term "polar loop" refers to a polar modulation transmitter architecture that applies closed-loop feedback control to both the phase and amplitude of a transmitted signal by using closed-loop control of the transmitted phase as well as the amplitude modulation. In general, an important issue in polar transmitter architectures is the measurement of amplitude and phase distortion in the transmit path (for example, in the power amplifier). In order to compensate for any amplitude and/or phase distortions, adaptive predistortion compensation can be applied to the modulation signal. However, dynamically compensating for distortions by using adaptive predistortion compensation requires feedback from the transmit signal so as to be able to dynamically measure and compensate for the transmit distortions. Due to the fact that the modulation signal is applied to the modulator in polar coordinates, it can be advantageous to have the feedback signal also in polar coordinates. Therefore, a phase feedback receiver and an amplitude feedback receiver may be used to determine the polar feedback signals for compensating for phase and amplitude distortions, respectively.

With respect to the phase feedback signal determination, a Cartesian feedback receiver may be used to convert the radio frequency (RF) feedback signal down to an analog baseband signal, and then successively convert the analog baseband signal to a digital signal using an analog-to-digital converter (ADC). Afterwards, in the digital domain, a Cartesian-to-Polar conversion can be performed. However, the use of a Cartesian receiver, in addition to requiring conversion to Polar coordinates, can be a cumbersome approach to extracting a phase signal. Another disadvantage of the use of a Cartesian receiver for down-conversion is the typically high current consumption of the receiver due to the high signal quality requirements of the Cartesian receiver. Furthermore, the requirements on the ADC can be significant, as well as the fact that two ADCs are required (i.e., for I & Q paths) to extract phase when using the Cartesian receiver approach to phase extraction.

BRIEF DESCRIPTION OF THE DRAWINGS

The accompanying drawing figures, in conjunction with the general description given above, and the detailed description of the implementations given below, serve to illustrate and explain the principles of the implementations of the best mode presently contemplated. In the figures, the left-most digit(s) of a reference number identifies the figure in which the reference number first appears. In the drawings, like numerals describe substantially similar features and components throughout the several views.

DETAILED DESCRIPTION

Figure 1:
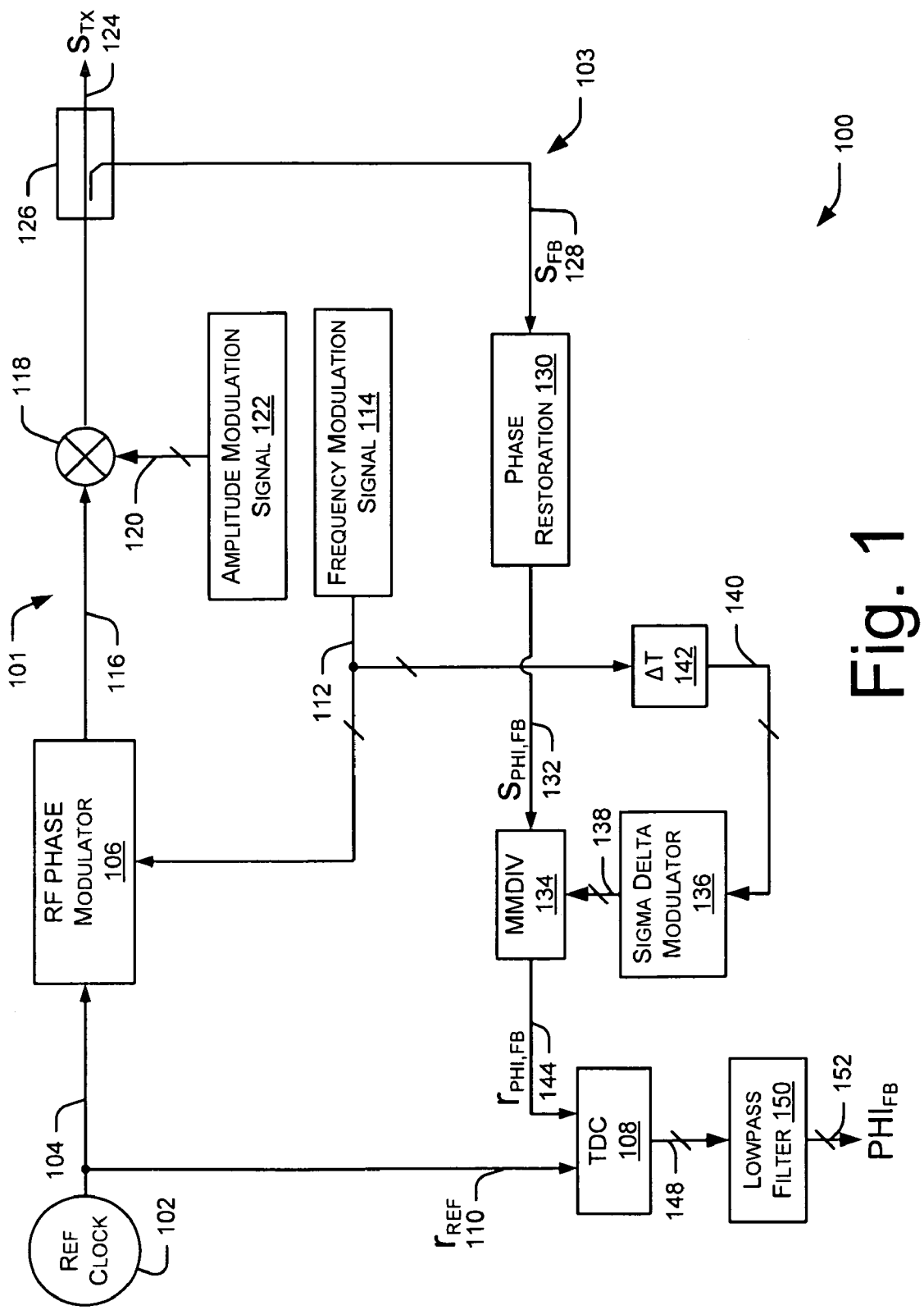
FIG. 1 is a circuit diagram illustrating an exemplary polar transmit architecture and phase feedback receiver implementation.

In the following detailed description, reference is made to the accompanying drawings which form a part of the disclosure, and in which are shown by way of illustration, and not of limitation, exemplary implementations. Further, it should be noted that while the detailed description provides various exemplary implementations, as described below and as illustrated in the drawings, this patent is not limited to the implementations described and illustrated herein, but can extend to other implementations, as would be known or as would become known to those skilled in the art. Reference in the specification to "one implementation", "this implementation" or "these implementations" means that a particular feature, structure, or characteristic described in connection with the implementations is included in at least one implementation, and the appearances of these phrases in various places in the specification are not necessarily all referring to the same implementation. Additionally, in the following detailed description, numerous specific details are set forth in order to provide a thorough disclosure. However, it will be apparent to one of ordinary skill in the art that these specific details may not all be needed. In other circumstances, well-known structures, materials, circuits, processes and interfaces have not been described in detail, and/or may be illustrated in block diagram form, so as to not unnecessarily obscure the disclosure.

This disclosure includes various arrangements and techniques for determining digital phase feedback in a polar transmitter or other systems in which determining phase distortion information is useful. In particular, the techniques included involve implementing a circuit providing phase distortion extraction which can then be used, for example, to dynamically compensate for phase distortions in a signal. A disclosed exemplary circuit can be implemented in a variety of electronic or communication devices or other systems that may require phase distortion compensation. Devices that can benefit from the circuit include, but are not limited to, polar transmitters including mobile phone transmitters, such as GSM (Global System for Mobile communications) or UMTS (Universal Mobile Telecommunications System). Further, while the following systems and methods are described with reference to a polar transmitter, such as for use in a mobile communication device, it will be appreciated that the disclosed techniques and circuits can be implemented generally in any similar electronic/communication system.

Exemplary implementations, as will be described in greater detail below, convert the phase feedback signal directly to the digital domain. Thus, in the exemplary implementations, no additional Cartesian-to-Polar conversion is necessary. Additionally, exemplary implementations include direct extraction of phase distortion information for measuring the phase distortion, which information may then be used for determining phase predistortion compensation in a polar transmitter or other system. For example, in some implementations, the phase distortion information may be sent to a processing block or other device which is able to use the information to determine coefficients for adjusting phase modulation transmit characteristics, such as for reducing phase distortion in a polar transmitter or other system.

Figure 2:
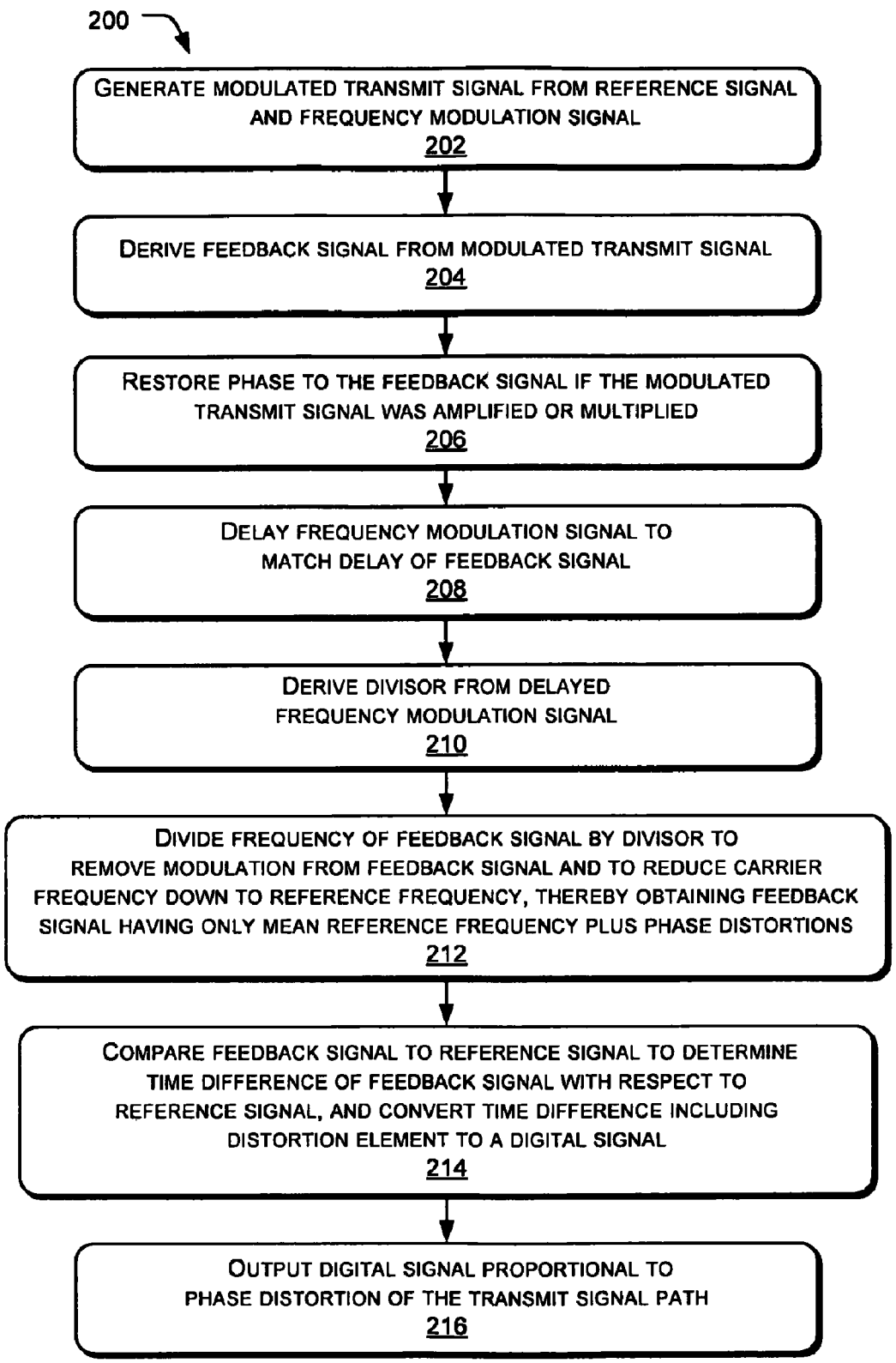
FIG. 2 is a flowchart illustrating an exemplary method for phase distortion determination in accordance with an exemplary implementation.

FIG. 1 illustrates a circuit diagram of a section of a polar transmitter including circuitry for phase distortion extraction according to exemplary implementations. FIG. 2 illustrates a block diagram for a method of carrying out phase distortion extraction according to exemplary implementations. It should be noted that the order in which the blocks are described is not intended to be construed as a limitation, and any number of the described system blocks can be combined in any order to implement the system and method, or an alternate system and method. Additionally, individual blocks may be deleted without departing from the spirit and scope of the subject matter described herein. Furthermore, the system and method can be implemented in any suitable hardware, firmware, or a combination thereof.

Exemplary Circuit

FIG. 1 illustrates an exemplary structure of a polar transmitter including a phase feedback receiver according to one possible implementation. Exemplary circuit 100 is meant to explain concepts related to isolation and measurement of phase distortion at a basic level and the number of components shown does not limit the actual implementation of circuit 100. Exemplary circuit 100 includes a transmit signal path 101 and a phase feedback path 103. In the transmit path 101, a reference clock 102 connected to an RF phase modulator 106 passes a reference clock signal 104 to RF phase modulator 106. This reference clock signal 104 is also delivered to a time-to-digital converter (TDC) 108 to serve as a reference signal $r_{REF}$ 110, as discussed further below.

RF phase modulator 106 receives the reference clock signal 104 and also receives a frequency modulation signal 112 from a frequency modulation signal block 114, and generates a phase-modulated RF carrier or transmit signal 116. Thus, the frequency modulation signal block 114 applies frequency modulation signal 112 to RF phase modulator 106. Phase modulator 106 receives frequency modulation 112 signal and reference clock signal 104 and produces phase-modulated transmit signal 116. In some implementations, the phase-modulated transmit signal 116 is a modulated high frequency oscillating signal having an instantaneous frequency that is equal to the reference clock signal frequency multiplied by the frequency of the frequency modulation signal 112. The modulation frequency signal 112 is applied digitally, so the RF phase modulator 106 generates the phase-modulated high frequency transmit signal 116 which is modulated according to digital modulation frequency signal 112 and, in some implementations, output to a mixer 118. The modulated transmit signal 116 is then multiplied at mixer 118 with an amplitude modulation signal 120 received from an amplitude modulation signal block 122 to generate a multiplied transmit signal $S_{TX}$ 124. Mixer 118 may be a multiplier, such as a Gilbert cell, or other device that carries out the same function. Alternatively, in some implementations, the modulated transmit signal 116 can be amplified directly by a power amplifier in place of mixer 118 and amplitude modulation signal 122 in order to generate the transmit signal 124. The proposed architecture should measure any phase distortions produced by the described mixer, power amplifier, or any other non-ideal element in the transmit path. Phase distortions are often related to amplitude level and therefore can be named AMPM distortions (i.e., Amplitude Modulation to Phase Modulation distortions)

In exemplary implementations, a purpose of the phase feedback path 103 is to detect any phase distortion of the modulated transmit signal $S_{TX}$ 124 after multiplication by the mixer 118 or a power amplifier, i.e., phase distortion caused by the transmit path 101. A coupler 126 therefore traces the signal output from the mixer 118 or power amplifier. The coupler 126 may be a directional coupler, which is used to send a signal in the forward direction, and which also provides a traced feedback signal $S_{FB}$ 128, which is derived from the transmit signal $S_{TX}$ 124, and which may be used in the feedback path 103 for determining phase distortion. In order to be able to detect the phase of feedback signal $S_{FB}$ 128, a phase restoration block 130 is used to remove the amplitude information from feedback signal $S_{FB}$ 128. Phase restoration block 130 may be, for example, a signal limiter or other device or arrangement configured to remove the amplitude information from feedback signal $S_{FB}$ 128.

After passing through phase restoration block 130, phase-restored feedback signal $S_{PHI,FB}$ 132 is still a high frequency signal, but now contains only phase information, including both the phase modulation and any phase distortion. In order to remove the phase modulation from signal $S_{PHI,FB}$ 132, a multi-modulus divider (MMDIV) 134 may be used. MMDIV 134 divides the high frequency signal down to a lower frequency and at the same time removes the phase modulation. A divider ratio sequence used by MMDIV 134 for dividing the high frequency signal is generated by a Sigma-Delta modulator 136 as an input signal 138. By causing the input signal 138 of the Sigma-Delta modulator 136 to be based on the frequency modulation signal 112, the division carried out by MMDIV 134 is able to cancel out the original phase modulation of the transmit signal if a delay of the modulation signal 112 is matched to the delay of the feedback path 103. Accordingly, in these implementations, a delayed frequency modulation signal 140 that is input to the sigma delta modulator 136 is exactly the same as the frequency modulation signal 112 which was used with the reference signal 104 in the RF phase modulator 106 to generate the transmit signal 116. The only difference is that delayed modulation signal 140 is delayed by $\Delta T$ compared to the original frequency modulation signal 112 so as to match a delay in the feedback signal reaching MMDIV 134.

A delay block delays the original frequency modulation signal 112 to compensate for the delay which is accumulated from the modulation signal input of the phase modulator 106 to signal $S_{PHI,FB}$ 132 that is input to MMDIV 134. In exemplary implementations, delay block 142 is implemented as an all-pass filter, and the actual delay can be programmable. However, this function can be implemented by any other technique or device known in the art so that the delay achieved by the delay block matches the delay in the feedback signal $S_{PHI,FB}$ 132 in reaching MMDIV 134, whereby the output signal 138 of the Sigma-Delta modulator 136 reaches MMDIV 134 at the same time as the feedback signal $S_{PHI,FB}$ 132 for matching the frequency modulation signal.

First, it may be assumed that the transmit path is ideal, i.e., does not add any phase distortion. The delayed frequency modulation signal 140 is received by Sigma-Delta modulator 136, which outputs to the MMDIV 134 a divider ratio 138 (i.e., a divisor) corresponding to the ratio between the instantaneous carrier frequency and the reference frequency, and which also corresponds to ratio between the instantaneous frequency of the feedback signal $S_{PHI,FB}$ 132 and reference frequency, so that the carrier frequency is reduced to reference frequency and original phase modulation added by RF phase modulator 106 is removed. In exemplary implementations, Sigma Delta modulator 136 outputs an instantaneous digital integer value corresponding to the delayed instantaneous frequency modulation signal 140, and this integer value is used as a divisor by MMDIV 134 to reduce the frequency of the feedback signal $S_{PHI,FB}$ 132 for removing the original phase modulation. Accordingly, after compensating for the delay in signal $S_{PHI,FB}$ 132 through use of the delay block 142, the original phase modulation portion of the feedback signal $S_{PHI,FB}$ 132 is removed by MMDIV 134, resulting in an output signal $r_{PHI,FB}$ 144. The divider ratio changes with a rate which is a number of times higher than the bandwidth of the original modulation (oversampled) so that on average the division tracks the original modulation. The mean value of the chosen divisor is chosen to divide the carrier down to the reference clock rate.

Now the case will be considered in which the transmit path produces some phase distortion due to non-ideal analog components. The output signal $r_{PHI,FB}$ 144 output by the MMDIV 134 has a mean frequency that is equal to the frequency of the reference signal $r_{REF}$ 110 output by the reference clock 102. Also included in the MMDIV output 144 is the phase distortion of the transmit path without the original phase modulation due to removal by MMDIV 134. Accordingly, the phase of the output signal $r_{PHI,FB}$ 144 relates to the reference clock phase, including any constant phase shift, plus any phase distortion added by the transmit path 101, i.e., the phase modulator 106, the mixer 118, and by the phase feedback path 103. By comparing the output signal $r_{PHI,FB}$ with the reference signal $r_{REF}$ 110, the phase distortion caused by the phase modulator 106, the mixer 118 (i.e., the transmit path 101) and phase feedback path 103 can be determined. Consequently, to be able to measure only phase distortion of the transmit path, any phase distortion caused by the phase feedback path 103 needs to be small in relation to the phase distortion caused by the transmit path elements, such as the mixer 118 or power amplifier, in order to not further distort the measurement result. The time difference of the MMDIV output signal $r_{PHI,FB}$ with respect to the reference clock 110 can be quantized and converted to the digital domain by Time-to-digital Converter (TDC) 108 and output as a digital signal 148. The TDC operates by comparing, for example, the rising edge of reference clock $r_{REF}$ 110 with the rising edge of $r_{PHI,FB}$, producing an output which is a digital quantized number relating to time difference between rising edges. If there is no distortion in the feedback path, then the output of the TDC will be a constant number relating to any constant phase shift between reference and feedback signals. If, however, the transmit path includes some distortion, then this distortion will be present at the output of the TDC 108 in the form of a quantized time delta.

Additionally, Sigma-Delta modulator 136 may introduce additional noise to the phase of the output signal $r_{PHI,FB}$ 144. Most of the energy of this noise however is at high frequencies due to the Sigma-Delta 136 characteristic, so the noise can be attenuated by a digital lowpass filter 150. Accordingly, following this attenuation, the feedback path 103 generates as output a digital signal $PHI_{FB}$ 152, which is proportional to the phase distortion of the transmit path 101 (except for a constant offset), as long as the additional distortion coming from the phase feedback path 103 is small. This difference phase signal $PHI_{FB}$ can then be sent back to the RF phase modulator 106 to dynamically correct the phase error in the transmit signal (polar loop transmitter), or the signal can be used to calculate phase pre-distortion characteristics (predistortion) for use in compensating a transmit signal in a non-dynamic way. Accordingly, implementations are appropriate for applications including polar modulators, polar loop transmitters, pre-distortion systems, or any transmitter system where it is desirable to improve or have knowledge of the phase characteristics of the transmitted signal.

Exemplary Method

FIG. 2 is a flowchart illustrating an exemplary method 200 for determining phase distortion in a polar loop transmitter, pre-distortion system, or the like. The method introduced may, but is not required to, be implemented at least partially in architectures such as illustrated in FIG. 1. The order in which the method below is described is not intended to be construed as a limitation, and any number of the described method blocks can be combined in any order to implement the method, or an alternate method. Thus, it is to be appreciated that certain acts in the method need not be performed in the order described, may be modified, and/or may be omitted entirely. Additionally, individual blocks may be deleted from the method without departing from the spirit and scope of the subject matter described herein. Furthermore, the method can be implemented in any suitable hardware, firmware, or a combination thereof.

At block 202, a reference clock signal and a frequency modulation signal are used to generate a transmit signal. In an implementation, the transmit signal is generated by an RF phase modulator referenced to a reference clock, where the RF phase modulator generates the modulated transmit signal based upon the received frequency modulation signal and the reference clock signal. Optionally, the transmit signal may also be multiplied or amplified following modulation.

At block 204, a trace signal is derived from the modulated transmit signal for use as a feedback signal. In an exemplary implementation, a coupler is used to derive the trace signal for use in a feedback loop.

At block 206, phase restoration of the feedback single is carried out if the transmit signal was mixed or amplified following generation of the transmit signal and prior to derivation of the feedback signal. In an exemplary implementation, the transmit signal may pass through an amplifier or multiplier prior to derivation of the feedback signal from the transmit signal. In these implementations, a signal limiter may be used to remove amplitude information from the feedback signal. Block 206 is only necessary if the amplitude of the signal has been affected, such as through use of a multiplier or amplifier on the modulated transmit signal, or in any case where amplitude modulation is used to convey information.

At block 208, the frequency modulation signal is delayed to match the delay of the feedback signal. In an exemplary implementation, an allpass filter is used to delay the frequency modulation signal.

At block 210, a divisor is derived from the delayed frequency modulation signal. In an exemplary implementation, a Sigma-Delta modulator is used to determine a divider ratio to use as a divisor for reducing the frequency of the feedback signal, whilst removing the original frequency modulation.

At block 212, the frequency of the feedback signal is divided by the divisor determined in block 210 to remove the modulation from the feedback single so as to obtain a feedback signal having only the phase distortions plus the reference phase. In an exemplary implementation, a multi modulus divider receives the divider ratio information from the Sigma Delta modulator, and the multi-modulus divider uses the divisor to divide the higher frequency single down to a lower frequency.

At block 214, the feedback signal is compared to a reference signal to determine a time difference representing the phase distortion portion, and the phase distortion potion is output as a digital signal in the form of a quantized time delta. In an exemplary implementation, the feedback signal output from the multi-modulus divider is delivered to a time-to-digital converter which uses the reference clock to extract the time delta from the feedback signal and convert the time delta portion to a digital output signal. Thus, the output signal from the multi-modulus divider is compared with a reference signal from the reference clock to determine the phase distortion of the modulation path. Optionally, in some implementations, the digital signal representing the phase distortion is then passed through a low pass filter to remove any noise added by the Sigma-Delta modulator. Accordingly, the method results in a digital difference phase signal that represents the phase distortion produced by the transmit path, assuming that any phase distortion produced by the feedback path is small compared to the overall phase distortion.

Exemplary implementations provide advantages that include that the phase feedback receiver does not measure the absolute phase of the transmit signal but only the difference from an ideal phase modulation signal. This greatly reduces the resolution requirements of the time-to-digital conversion. Due to the fact, that the ideal phase modulation signal is exactly known, because it is the same signal as that which is applied at the RF phase modulator 106, the generated difference signal very closely equals the actual phase distortion. Furthermore, exemplary implementations do not require a dedicated ADC, let alone the two ADCs that are required when using a Cartesian demodulation approach to extract phase. Instead, in exemplary implementations, only a single TDC is used.

As will be apparent from the foregoing disclosure, implementations provide for a phase feedback path which determines the phase distortion of a transmit signal by using a phase restoration block, a multi modulus divider whose divider ratio is switched by a Sigma-Delta modulator, and a time to digital converter. The known phase modulation is removed from the feedback signal by the multi modulus divider, so that the TDC measures only the time difference between the feedback signal and the ideal reference signal generated from the reference clock, therefore producing a measure of phase distortion. This determined time difference representing the phase distortions added primarily by the transmit path can be used for adaptive predistortion compensation calculations in order to compensate for the phase distortions of the transmit path (e.g., from the modulator and multiplier or power amplifier).

Further, it should be noted that the system configuration illustrated in FIG. 1 is purely exemplary of systems in which the implementations may be provided, and the implementations are not limited to a particular hardware configuration. In the description, numerous details are set forth for purposes of explanation in order to provide a thorough understanding of the disclosure. However, it will be apparent to one skilled in the art that not all of these specific details are required.

From the foregoing, it will be apparent that methods and apparatuses for determining the phase distortion of a transmit signal are provided. Additionally, while specific implementations have been illustrated and described in this specification, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Rather, the scope of this patent is to be determined entirely by the following claims, which are to be construed in accordance with the established doctrines of claim interpretation, along with the full range of equivalents to which such claims are entitled.

What is claimed is:

1. A circuit for determining a phase distortion comprising:
   a phase modulator that receives a reference signal and a frequency modulation signal for generating a first signal;
   a delay block that receives and delays the frequency modulation signal;
   a Sigma-Delta modulator that receives the delayed frequency modulation signal for determining a corresponding divider ratio;
   a multi-modulus divider that receives a feedback signal derived from the first signal and divides the feedback signal according to the divider ratio received from the Sigma-Delta modulator for removing phase modulation applied by the phase modulator; and
   a time-to-digital converter for receiving the feedback signal output from the multi-modulus divider and the reference signal as inputs, and for outputting a derived signal representing phase distortion of the first signal.

2. The circuit according to claim 1, further comprising:
   a multiplier for multiplying the first signal with an amplitude modulation signal prior to deriving the feedback signal from the first signal; and
   a phase restoration block that receives the feedback signal prior to the multi-modulus divider for restoring phase to the feedback signal.

3. The circuit according to claim 1, further comprising a lowpass filter for receiving the derived signal representing phase distortion of the first signal and for removing noise added by the Sigma-Delta modulator.

4. The circuit according to claim 1, wherein the delay block is an all-pass filter that delays the frequency modulation signal to match a delay in the feedback signal.

5. The circuit according to claim 1, further comprising a directional coupler for receiving the first signal following modulation and from which the feedback signal is derived as a trace signal.

6. The circuit according to claim 1, further comprising a reference clock for providing the reference signal to the phase modulator and for providing the reference signal to the time-to-digital converter.

7. The circuit according to claim 1, wherein the derived signal that is output by the time-to-digital converter is a derived time difference representing phase distortion added to the first signal in a transmit path including the phase modulator.

8. The circuit according to claim 1,
   wherein the phase modulator and a multiplier or a power amplifier make up a transmit path of the first signal, and
   wherein phase distortion added to the feedback signal by a feedback path is small compared to phase distortion added to the first signal by the transmit path.

9. The circuit according to claim 2, wherein the phase restoration block includes a signal limiter for removing amplitude information from the feedback signal.

10. The circuit according to claim 1, wherein the multi-modulus divider removes the phase modulation applied by the phase modulator by dividing a frequency of the feedback signal according to the divider ratio received from the Sigma-Delta modulator to reduce the frequency of the feedback signal, whereby the phase modulation is removed.

11. The circuit according to claim 1, wherein the derived signal is used for adaptive predistortion compensation for compensating for phase distortion in the first signal caused by a transmit path including the phase modulator.

12. A circuit for determining a phase distortion in a transmit path of a polar transmitter, comprising:
   a reference clock for outputting a reference signal;
   a phase modulator that receives the reference signal and a frequency modulation signal for generating a modulated first signal;
   a multiplier that multiplies the modulated first signal with an amplitude modulation signal for producing a transmit signal, wherein the transmit path includes the phase modulator and the multiplier;
   a coupler for deriving a feedback signal from the transmit signal;
   a phase restoration block that receives the feedback signal and removes amplitude information therefrom;
   a delay block that receives and delays the frequency modulation signal to match a delay in the feedback signal;

a Sigma-Delta modulator for receiving the delayed frequency modulation signal for determining a corresponding divider ratio;

a multi-modulus divider for receiving the feedback signal derived from the phase restoration block and dividing the feedback signal according to the divider ratio received from the Sigma-Delta modulator for removing phase modulation applied by the phase modulator; and a time-to-digital converter for receiving the feedback signal from the multi-modulus divider and the reference signal as inputs and for outputting a derived representation of the phase distortion in form of a time delta.

13. The circuit according to claim 12, wherein the time-to-digital converter outputs the time delta as a digital signal representing phase distortion caused by the transmit path of the first signal.

14. The circuit according to claim 12, wherein the measured phase distortion signal is used for reducing transmit distortion and therefore improving spectral quality or other transmit parameter of said transmit path.

\* \* \* \* \*